(12) United States Patent
Wang et al.

(10) Patent No.: US 10,611,025 B2
(45) Date of Patent: Apr. 7, 2020

(54) METHOD AN DEVICE FOR EVALUATING PERFORMANCE OF INDUSTRIAL CONTROL LOOPS BASED ON FULL LOOP RECONSTRUCTION SIMULATIONS

(71) Applicant: SHANDONG UNIVERSITY OF SCIENCE AND TECHNOLOGY, Qingdao, Shandong (CN)

(72) Inventors: Jiandong Wang, Qingdao (CN); Zijiang Yang, Qingdao (CN)

(73) Assignee: SHANDONG UNIVERSITY OF SCIENCE AND TECHNOLOGY, Shangdong (CN)

( * ) Notice: Subject to any disclaimer, the term of this patent is extended or adjusted under 35 U.S.C. 154(b) by 0 days.

(21) Appl. No.: 16/076,440

(22) PCT Filed: Nov. 6, 2017

(86) PCT No.: PCT/CN2017/109548
§ 371 (c)(1),
(2) Date: Aug. 8, 2018

(87) PCT Pub. No.: WO2019/051963
PCT Pub. Date: Mar. 21, 2019

(65) Prior Publication Data
US 2019/0160661 A1 May 30, 2019

(30) Foreign Application Priority Data
Sep. 12, 2017 (CN) .......................... 2017 1 0817779

(51) Int. Cl.
*B25J 9/16* (2006.01)
*G06N 7/00* (2006.01)
(Continued)

(52) U.S. Cl.
CPC ............. *B25J 9/163* (2013.01); *B25J 9/1653* (2013.01); *B25J 9/1674* (2013.01);
(Continued)

(58) Field of Classification Search
CPC ....................................................... B25J 9/163
See application file for complete search history.

(56) References Cited

U.S. PATENT DOCUMENTS

| 6,263,355 B1 * | 7/2001 | Harrell | .................... C08F 10/00 |
| | | | 708/320 |
| 2011/0288846 A1 | 11/2011 | Kihas | |

FOREIGN PATENT DOCUMENTS

| CN | 102393627 A | 3/2012 |
| CN | 102998974 A | 3/2013 |

(Continued)

OTHER PUBLICATIONS

"1. Tuning PID Control by Simulation," 1997, Microstar Laboratories, pp. 1-13 (Year: 1997).*
(Continued)

*Primary Examiner* — Kamini S Shah
*Assistant Examiner* — Russ Guill
(74) *Attorney, Agent, or Firm* — Oliff PLC (57) ABSTRACT

A method and device for evaluating the performance of an industrial control loop based on full loop reconstruction simulations. The method comprises: performing reconstruction simulation on control modules one by one except a controlled object in the loop, and judging the correctness of the reconstructed modules; establishing a mathematical model of the object, connecting the mathematical model to the reconstructed modules to complete reconstruction of the entire loop, and optimizing the mathematical model of the object to obtain an optimized model of the object; adjusting parameters of the modules according to a control perfor-
(Continued)

mance index, and performing simulation calculation on the reconstructed loop using the parameters to obtain an ideal value of the reconstructed performance control index for evaluating the performance of the loop. The loop is reconstructed, the influence of the modules, a PID controller, a filter, a piece-wise linear function and a deadband, on the performance is evaluated.

9 Claims, 2 Drawing Sheets

(51) Int. Cl.
  *G05B 17/02*   (2006.01)
  *G05B 13/04*   (2006.01)
(52) U.S. Cl.
  CPC ........... *G05B 13/044* (2013.01); *G05B 17/02* (2013.01); *G06N 7/00* (2013.01)

(56) References Cited

FOREIGN PATENT DOCUMENTS

| | | |
|---|---|---|
| CN | 103309237 A | 9/2013 |
| CN | 107085420 A | 8/2017 |

OTHER PUBLICATIONS

A.H. Jones et al., "Genetic auto-tuning of PID controllers," 1995, Conference Publication 414, IEE, Genetic Algorithms in Engineering Systems: Innovations and Applications, pp. 141-145 (Year: 1995).*
M. Jelali, "An overview of control performance assessment technology and industrial applications," 2006, Control Engineering Practice, vol. 14, pp. 441-466 (Year: 2006).*
Pasi Laakso et al., "methods of simulation-assisted automation testing," 2005, VTT Industrial Systems, 64 pages (Year: 2005).*
Jyh-Cheng Jeng et al., "A one-step tuning method for PID controllers with robustness specification using plant step-response data," 2014, Chemical Engineering Research and Design, vol. 92, pp. 545-558 (Year: 2014).*
Yu et al.; "Performance assessment of static lead-lag feedforward controllers for disturbance rejection in PID control loops"; ISA Transactions, vol. 64, pp. 67-76; Published May 4, 2016.
Jun. 11, 2018 International Search Report issued in International Patent Application No. PCT/CN2017/109548.
Jun. 11, 2018 Written Opinion issued in International Patent Application No. PCT/CN2017/109548.
Sun et al.; "PID controller performance evaluation"; Control and Instruments in Chemical Industry, Issue 5, vol. 31, USSN: 1000-3932, pp. 21-23; Dec. 31, 2014.

* cited by examiner

METHOD AN DEVICE FOR EVALUATING PERFORMANCE OF INDUSTRIAL CONTROL LOOPS BASED ON FULL LOOP RECONSTRUCTION SIMULATIONS

FIELD OF THE INVENTION

The present invention belongs to the technical field of process control, and particularly relates to a method and a device for evaluating the performance of industrial control loops based on full loop reconstruction simulations.

BACKGROUND OF THE INVENTION

Distributed control systems (DCSs) are generally configured in modern process industries, such as power, petrochemicals, etc. A typical industrial process unit includes nearly 100 control loops to implement automatic control on main variables in production processes. Thus, control loops are the key assets to determine safe and efficient operations of industrial processes. It is very necessary to automatically evaluate the performance of industrial control loops, detect the control loops with poor performance promptly and provide the improvement potentials and technical solutions for the control performance, so that satisfactory control performance is achieved in the industrial processes over a long-term operation.

The basic principle of performance evaluation of a control loop is to find out an ideal value of a certain control performance index that can be achieved under some practical constraints, and to compare the ideal value as a reference value with the current value of the performance index to evaluate the control performance of the control loop. The most widely accepted and commonly used control loop performance evaluation method is the one based on minimum variance control, proposed by Professor T. Harris from Queen's University in Canada in 1989. However, the method has two major limitations:

First, it does not consider the restriction from the structure of a proportional-integral-derivative (PID) controller commonly used in the industry on the dynamic control performance, so that a PID controller based control loop with better control performance is misjudged as having poor performance;

Second, a variance is used as a performance index, which is more suitable for evaluating the performance of a control loop in overcoming random noise, but not suitable for evaluating the performance of tracking a reference value and overcoming measurable (deterministic) external disturbances.

Therefore, since 2004, Professor T. F. Edgar from U.S. Texas University and other experts have studied the effect of the structure of the PID controller on the control performance. An approximate value of an ideal value of a control performance index of the PID controller can be obtained by adopting performance indices such as an integrated absolute value of a control error through numerical approximation method. However, in industrial applications, the above available technologies have a major problem:

Besides PID controllers, there are also many other control modules, such as filters, piece-wise linear functions and dead-bands which are indispensable to the industrial control loop. Thus, when the performance of the control loop is evaluated, it is necessary to consider the important influence of these control modules on the control performance. However, in the available technologies, only one control module, named the PID controller, instead of many other control modules objectively existing in the industrial control loop, is considered, and important influence of the other control modules on the control performance cannot be evaluated, resulting in inaccurate, incomplete or even erroneous performance evaluation results.

In summary, there are no effective solutions in the available technologies, and the performance of the control loop in process industries cannot be accurately and comprehensively evaluated.

SUMMARY OF THE INVENTION

In order to solve the above problem, the present invention provides a method and a device for evaluating the performance of an industrial control loop based on full loop reconstruction simulations. Not only the important influences of PID controllers but also other control modules such as filters, piece-wise linear functions and dead bands are considered, thereby obtaining a control performance evaluation result consistent with actual situations of the industrial control loop. An improved corresponding technical solution is provided for the control performance. The first objective of the present invention is to provide a method for evaluating the performance of an industrial control loop based on full loop reconstruction simulations.

In order to achieve the above objective, the following technical solution is proposed in the present invention:

A method for evaluating the performance of an industrial control loop based on full loop reconstruction simulations, including:

performing reconstruction simulation on control modules one by one except a controlled object in the control loop, and judging the correctness of the reconstructed control modules;

establishing a mathematical model of the controlled object, connecting the mathematical model to the reconstructed control modules to complete the reconstruction of the entire control loop, and optimizing the mathematical model of the controlled object to obtain an optimized model of the controlled object; and adjusting parameters of the control modules according to a control performance index, and performing simulation calculation on the reconstructed control loop using the parameters to obtain an ideal value of the reconstructed control performance index.

The control modules and the connection relationship between the control modules are determined according to the actual control loop; and the control modules include but are not limited to a PID controllers, filters, piece-wise linear functions and/or dead-bands.

As a further preferred solution, the judging the correctness of the reconstructed control modules includes the following specific steps:

calculating the average value of a control instruction of the control loop;

inputting a controlled variable and a reference value of the control loop as input values of the reconstructed control loop composed of the reconstructed control modules to obtain an output of the reconstructed control loop as a reconstructed value of the control instruction of the control loop; and determining a first performance index according to the control instruction of the control loop, the average value of the control instruction and the reconstructed value of the control instruction for judging the correctness of the reconstructed control modules.

As a further preferred solution, when the judged correctness of the reconstructed control modules is satisfied, the mathematical model of the controlled object is established next;

otherwise, the reconstructed control modules have large errors, the construction algorithm of each control module is checked to find out and correct the errors, the control modules are reconstructed, and the correctness of the reconstructed control modules is judged until the judged correctness of the reconstructed control modules is satisfied.

In the present invention, the method of establishing the mathematical model of the controlled object includes but is not limited to adopting an autoregressive discrete model, a linear model or a nonlinear model.

As a further preferred solution, the optimizing the mathematical model of the controlled object includes the following specific steps:

establishing an optimization function according to the reconstructed entire control loop, the physical meaning of the optimization function being the degree of fitness between the control instruction of the entire control loop and the reconstructed value and observed value of the controlled variable; and taking the maximum value of the optimization function to obtain the optimized model of the controlled object.

As a further preferred solution, after the mathematical model of the controlled object is optimized, the judging correctness of the optimized model of the controlled object includes the following specific steps:

determining the weights of the control instruction of the entire control loop and the controlled variable, the sum of the two weights being 1;

calculating the average value of the control instruction of the entire control loop; calculating the average value of the controlled variable according to the controlled variable of the entire control loop;

inputting the controlled variable and the reference value of the entire control loop as input values of the reconstructed entire control loop to obtain an input of the optimized model of the controlled object as a reconstructed value of the control instruction of the entire control loop and an output of the reconstructed entire control loop as a reconstructed value of the controlled variable of the entire control loop; and determining a second performance index according to the weights of the control instruction of the reconstructed entire control loop and the controlled variable, the average values of the control instruction and the controlled variable and the reconstructed values of the control instruction and the controlled variable for judging the correctness of the optimized model of the controlled object.

As a further preferred solution, the evaluating the performance of the control loop includes the following specific steps:

selecting at least one control performance index to adjust the parameters of the control modules;

performing simulation calculation using the adjusted parameters in the reconstructed entire control loop to obtain a corresponding reconstructed control performance index, and acquiring an ideal value that can be achieved by the reconstructed control performance index; and comparing the selected control performance index with the ideal value of the reconstructed control performance index to obtain a performance evaluation index of the control loop, thereby evaluating the control performance of the entire control loop.

As a further preferred solution, the defining the reliability of the obtained performance evaluation index of the control loop includes the following specific steps:

generating matched random model parameters according to the statistical distribution of parameters of the optimized model of the controlled object, and performing simulation calculation using the adjusted random model parameters in the reconstructed entire control loop to obtain a confidence interval of the performance evaluation index of the control loop.

The second objective of the present invention is to provide a computer readable storage medium.

In order to achieve the above objective, the following technical solution is adopted in the present invention:

A computer readable storage medium stores a plurality of instructions adapted to be loaded by a processor of a mobile terminal device to perform the following processing:

performing reconstruction simulation on control modules one by one except a controlled object in a control loop, and judging the correctness of the reconstructed control modules;

establishing a mathematical model of the controlled object, connecting the mathematical model to the reconstructed control modules to complete reconstruction of the entire control loop, and optimizing the mathematical model of the controlled object to obtain an optimized model of the controlled object; adjusting parameters of the control modules according to a control performance index, and performing simulation calculation on the reconstructed control loop using the parameters to obtain an ideal value of the reconstructed performance control index for evaluating the performance of the control loop.

The third objective of the present invention is to provide a terminal device.

In order to achieve the above objective, the following technical solution is adopted in the present invention:

a terminal device includes a processor and a computer readable storage medium, wherein the processor is used for implementing instructions; and the computer readable storage medium is used for storing a plurality of instructions, which are adapted to be loaded by the processor to perform the following processing:

performing reconstruction simulation on control modules one by one except a controlled object in a control loop, and judging the correctness of the reconstructed control modules;

establishing a mathematical model of the controlled object, connecting the mathematical model to the reconstructed control modules to complete reconstruction of the entire control loop, and optimizing the mathematical model of the controlled object to obtain an optimized model of the controlled object; and adjusting parameters of the control modules according to a control performance index, and performing simulation calculation on the reconstructed control loop using the parameters to obtain an ideal value of the reconstructed performance control index for evaluating the performance of the control loop.

The present invention has the following advantages:

According to the method and the device for evaluating the performance of an industrial control loop based on full loop reconstruction simulations according to the present invention, under computer environments, each control module of the industrial control loop is reconstructed, simulation calculation is performed on the reconstructed control loop, and the degree of influence of each control module on the performance of the control loop is evaluated to give an improved and optimized technical solution for the control performance. Compared with the prior art, the present invention has the following advantages:

1) The objects of performance evaluation are expanded: the present invention not only can evaluate the influence of the PID controller on the control performance, but also can evaluate the influence of the control modules such as a filter, a piece-wise linear function and a dead-band on the control performance.

2) The estimated accuracy of the mathematical model of the controlled object is improved: the second performance index not only compares the degrees of fitness of the controlled variable and a reconstructed signal thereof, but also compares the degrees of fitness of the control instruction and a reconstructed signal thereof, thereby effectively improving the estimated accuracy of the mathematical model.

3) The reliability of the performance evaluation results is quantified: matched random model parameters are generated according to the statistical distribution of model parameters, and simulation calculation is performed on the reconstructed control loop to obtain a confidence interval of the performance evaluation index.

BRIEF DESCRIPTION OF THE DRAWINGS

The accompanying drawings constituting a part of the present application are used for further understanding of the present application, and the schematic embodiments of the present application and the description thereof are used for interpreting the present application, rather than constituting improper limitation to the present application.

DETAILED DESCRIPTION OF THE EMBODIMENTS

It should be noted that the following detailed descriptions are all exemplary and intend to provide descriptions as further preferred solutions for the present application. Unless otherwise specified, all technical and scientific terms used herein have the same meanings generally understood by those of ordinary skill in the art of the present application.

It should be noted that the terms used herein are merely for describing specific embodiments, and are not intended to limit exemplary embodiments according to the present application. As used herein, unless otherwise explicitly stated by the context, a singular form is also intended to include a plural form, in addition, it should also be understood that the terms "include" and/or "comprise" used in the specification indicates the presence of features, steps, operations, devices, components and/or combinations thereof.

The embodiments in the present application and the features in the embodiments can be combined with each other without conflicts. The present invention will be further illustrated below in conjunction with the accompanying drawings and embodiments.

The present invention provides a method and a device for evaluating the performance of an industrial control loop based on full loop reconstruction simulations, which effectively solve the problems of control performance evaluation of the industrial control loop. The important influences of not only PID controllers but also other modules such as filters, piece-wise linear functions and dead-bands are considered, thereby obtaining a control performance evaluation result consistent with actual situations of the industrial control loop, and providing an improved and optimized technical solution for the control performance.

Embodiment 1

The objective of embodiment 1 is to provide a method for evaluating the performance of an industrial control loop based on full loop reconstruction simulations.

Figure 1:
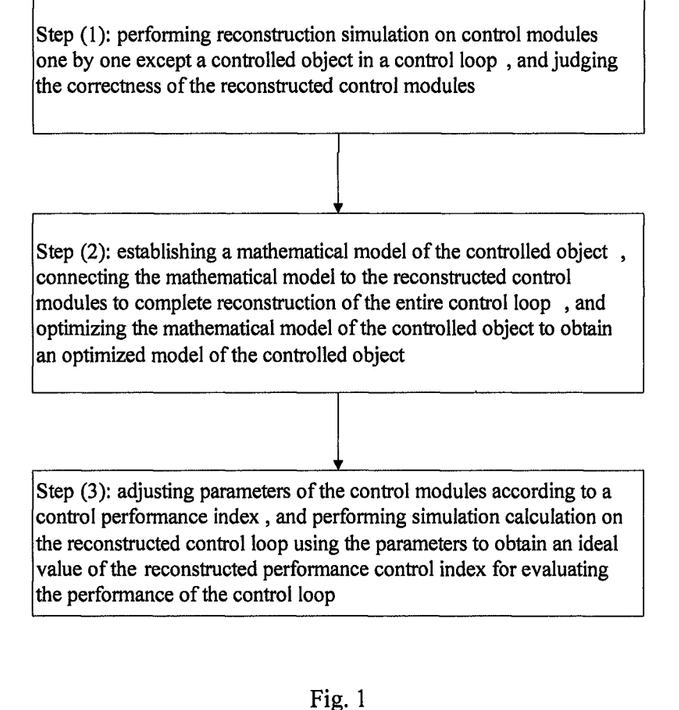
FIG. 1 is a specific flow diagram of the method according to the present invention.

In order to achieve the above objective, the following technical solution is adopted in the present invention:

As shown in FIG. 1, a method for evaluating the performance of an industrial control loop based on full loop reconstruction simulations, including:

Step (1): performing reconstruction simulation on control modules one by one except a controlled object in the control loop, and judging the correctness of the reconstructed control modules;

Step (2): establishing a mathematical model of the controlled object, connecting the mathematical model to the reconstructed control modules to complete reconstruction of the entire control loop, and optimizing the mathematical model of the controlled object to obtain an optimized model of the controlled object; and Step (3): adjusting parameters of the control modules according to a control performance index, and performing simulation calculation on the reconstructed control loop using the parameters to obtain an ideal value of the reconstructed performance control index for evaluating the performance of the control loop.

Step (1): Reconstruction of the Control Modules:

The control modules and the connection relationship between the control modules are determined according to the actual control loop; and the control modules include but are not limited to PID controllers, filters, piece-wise linear functions and/or dead-bands.

Figure 2:
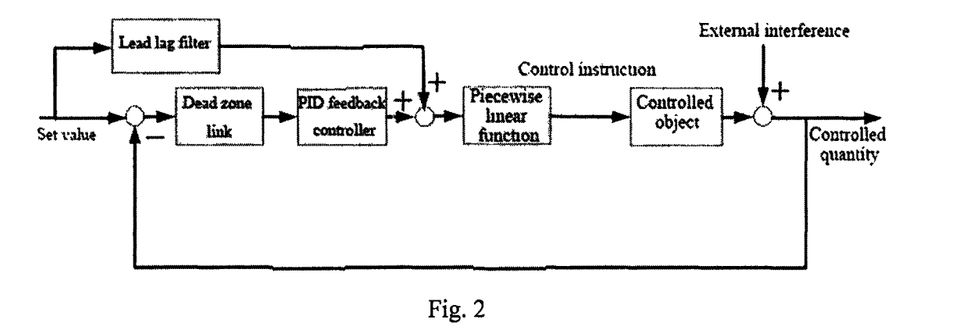
FIG. 2 is a structure diagram of an industrial control loop according to embodiment 1 of the present invention.

As shown in FIG. 2, in the industrial control loop of this embodiment, the controlled object is a hardware device, and the control loop further includes a PID controller, a filter, a piece-wise linear function and a dead-band except that the control module of the controlled object is a software algorithm control module in a DCS, wherein the dead-band, the PID feedback controller and the piece-wise linear function are connected in sequence from the input of a reference value to the generation of a control instruction, and a feed-forward lead lag filter is connected in parallel before the reference value is input to the piece-wise linear function. The output controlled variable is fed back to the input end of the dead-band.

Figure 3:
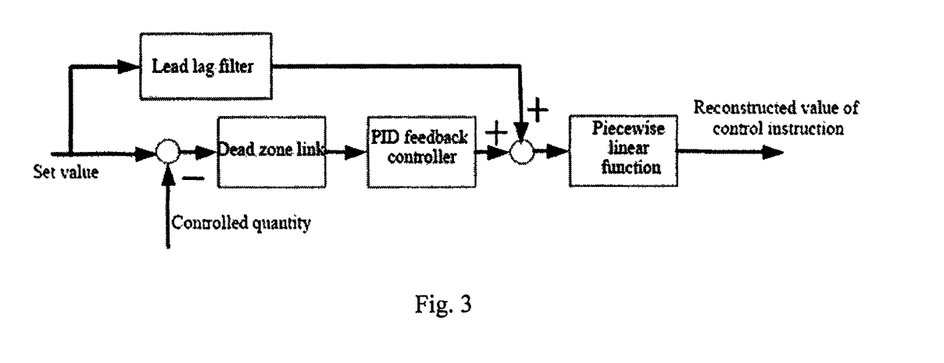
FIG. 3 is a principle diagram of a control loop composed of reconfigured control modules according to embodiment 1 of the present invention.

In this embodiment, the control modules (the PID controller, the filter, the piece-wise linear function and the dead-band) are reconstructed by writing a software program in a computer environment, and implementing a software algorithm of each module to have the same function as the corresponding software module in the industrial control loop, so as to achieve reconstruction of the software modules in the industrial control loop. The reconstructed control modules are shown in FIG. 3.

In this embodiment, the correctness of the reconstructed control modules is judged through a performance index $J_u$ based on historical data $\{u(t),y(t),r(t)\}_{i=1}^{N}$ of a control instruction u(t), a controlled variable y(t) and a reference value r(t).

The judging the correctness of the reconstructed control modules includes the following specific steps:

calculating the average value ũ(t) of a control instruction u(t) of the control loop; taking a controlled variable y(t) and a reference value r(t) of the control loop as input values of the reconstructed control loop composed of the reconstructed control modules to obtain an output of the reconstructed control loop as a reconstructed value û(t) of the control instruction of the control loop; and determining a first performance index $J_u$ according to the control instruction u(t) of the control loop, the average value ũ(t) of the control instruction and the reconstructed value û(t) of the control instruction for judging the correctness of the reconstructed control modules:

$$J_u = \min\left(1, \max\left(0, \sum_{t=1}^{N}(u(t)-\hat{u}(t))^2 \Big/ \sum_{t=1}^{N}(u(t)-\bar{u}(t))^2\right)\right)$$

wherein, u(t) is a control instruction, ũ(t) is the average value of the control instruction, û(t) is the reconstructed value of the control instruction, that is, the controlled variable y(t) and the reference value r(t) are used as the input of the reconstructed control modules and the corresponding output of the reconstructed control modules.

In this embodiment, the value range of the performance index $J_u$ is [0, 1]. If the value of $J_u$ is close to 1, it indicates that the reconstructed control modules are correct, otherwise, the reconstructed control modules have errors.

When the judged correctness of the reconstructed control modules is satisfied, the mathematical model of the controlled object is established next;

otherwise, the reconstructed control modules have errors, the construction algorithm of each control module is checked to find out and correct errors, the simulation control modules are reconstructed, and the correctness of the reconstructed control modules is judged until the judged correctness of the reconstructed control modules is satisfied, i.e., the value of $J_u$ is close to 1.

Step (2): estimation of the mathematical model of the controlled object:

In the industrial control loop, the controlled object is a physical hardware device, the input signal is a control instruction, and the output signal is a controlled variable.

For example, the controlled instruction in a load control loop of a thermal power unit is a control instruction applied to a main steam regulating valve, the controlled variable is the actual power of a thermal power unit, and the controlled object includes the main steam regulating valve, a steam turbine, a generator and other hardware devices.

In the present invention, the method of establishing the mathematical model of the controlled object includes but is not limited to adopting an autoregressive discrete model, a linear model or a nonlinear model. In this embodiment, an autoregressive discrete model serving as the mathematical model is adopted to describe the dynamic change process that the output signal of the controlled object serving as a hardware object responds to the input signal. The mathematical expression of the autoregressive discrete model is:

$$A(q)y(t)=B(q)u(t)+e(t),$$

wherein, y(t) is the mathematical model output of the controlled object, u(t) is the mathematical model input of the controlled object, and A(q) and B(q) are mathematical model polynomials of the controlled object:

$$A(q)=1+a_1q^{-1}+a_2q^{-2}+a_{n_a}q^{-n_a}$$

$$B(q)=1+b_1q^{-n_d-1}+b_2q^{-n_b-2}+b_{n_b}q^{-n_d-n_b}$$

wherein, $q^{-1}$ is a shift operator, e.g., $q^{-1}u=u(t-1)$. Order parameters $n_a$, $n_b$, $n_d$ and model parameters $a_1, a_2, \ldots, a_n$ and $b_1, b_2, \ldots, b_{n_b}$ are parameters that need to be estimated from the historical data $\{u(t), y(t),r(t)\}_{i=1}^{N}$ of the control instruction u(t), the controlled variable y(t) and the reference value r(t).

The optimizing the mathematical model of the controlled object includes the following specific steps:

establishing an optimization function according to the reconstructed entire control loop, the physical meaning of the optimization function being the degree of fitness between the control instruction of the entire control loop and the reconstructed value and observed value of the controlled variable; and taking the maximum value of the optimization function to obtain the optimized model of the controlled object.

Figure 4:
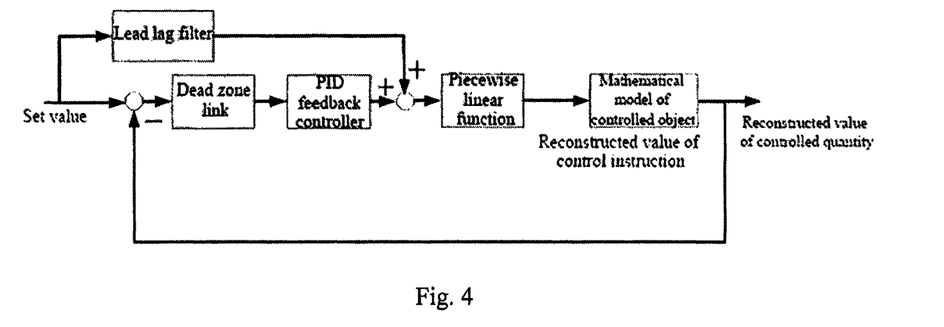
FIG. 4 is a principle diagram illustrating estimation of a mathematical model of a controlled object according to embodiment 1 of the present invention.

FIG. 4 shows the reconstructed entire control loop.

A novel parameter estimation method is proposed in this embodiment. The method mainly includes reconstructing the entire control loop to establish a new optimization function based on step (1), its physical meaning is the degree of fitness between the control instruction and the reconstructed value and observed value of the controlled variable, and the maximum value of the optimization function is taken to obtain the mathematical model of the controlled object. The mathematical expression of the parameter estimation method is:

$$[\hat{n}_a, \hat{n}_b, \hat{n}_d, \hat{a}_1, \hat{a}_2, \ldots, \hat{a}_{n_a}, \hat{b}_1, \hat{b}_2, \ldots, \hat{b}_{n_b}] =$$
$$\mathop{\mathrm{argmax}}_{[n_a,n_b,n_d,a_1,a_2,\ldots,a_{n_a},b_1,b_2,\ldots,b_{n_b}]} J_{y,u}$$

where $$J_{y,u} == \min\left(1, \max\left(0, w_y \frac{\sum_{t=1}^{N}(y(t)-\tilde{y}(t))^2}{\sum_{t=1}^{N}(y(t)-\bar{y}(t))^2} + w_u \frac{\sum_{t=1}^{N}(u(t)-\tilde{u}(t))^2}{\sum_{t=1}^{N}(u(t)-\bar{u}(t))^2}\right)\right)$$

instruction u(t), y(t) is the controlled variable, ȳ(t) is the average value of the controlled variable, $w_u$ and $w_y$ are respectively the weights of the control instruction and the controlled variable, and the sum of the two weights is 1, i.e., $w_u+w_y=1$; ũ(t) and ỹ(t) are respectively reconstructed values of the control instruction and the controlled variable calculated using the observed value of the historical data of the reference value r(t) as the input of the reconstructed entire control loop through the reconstructed software modules and the mathematical model of the controlled object.

When the model parameters and the order parameters are estimated, the present invention is not limited to a specific technical method to solve the optimization problem involved, and a plurality of technical methods such as a grid search algorithm, a least squares algorithm and a genetic optimization algorithm can be adopted to solve the optimization problem.

In this embodiment, after the mathematical model of the controlled object is optimized, the judging the correctness of the optimized model of the controlled object includes the following specific steps:

determining the weights $w_u$ and $w_y$ of the control instruction of the entire control loop and the controlled variable, the sum of the two weights being 1, i.e., $w_u+w_y=1$;

calculating the average value $\bar{u}(t)$ of the control instruction $u(t)$ of the entire control loop; calculating the average value $\bar{y}(t)$ of the controlled variable according to the controlled variable $y(t)$ of the entire control loop;

inputting the controlled variable $y(t)$ and the reference value $r(t)$ of the entire control loop as input values of the reconstructed entire control loop to obtain an input of the optimized model of the controlled object as a reconstructed value $\tilde{u}(t)$ of the control instruction of the entire control loop and an output of the reconstructed entire control loop as a reconstructed value $\tilde{y}(t)$ of the controlled variable of the entire control loop; and determining a second performance index $J_{y,u}$ according to the weights $w_u$ and $w_y$ of the control instruction of the reconstructed entire control loop and the controlled variable, the average values $\bar{u}(t)$ $\bar{y}(t)$ of the control instruction and the controlled variable and the reconstructed values $\tilde{u}(t)$ $\tilde{y}(t)$ of the control instruction and the controlled variable for judging the correctness of the optimized model of the controlled object.

The value range of the second performance index $J_{y,u}$ is [0,1]. If $J_{y,u}$ is close to 1, that is, the two reconstructed signals $\tilde{u}(t)$ and $\tilde{y}(t)$ are consistent with the observed values of the historical data of $u(t)$ and $y(t)$, indicating that the quality of the mathematical model of the controlled object is good. Otherwise, the quality of the mathematical model of the controlled object is poor, and new model parameters need to be found out to improve the quality of the model. It should be noted that $\tilde{u}(t)$ and $\hat{u}(t)$ in step (1) are referred to as reconstructed values of the control instruction, but the calculation methods of the both are obviously different.

Step (3): Evaluation of Control Performance:

In this embodiment, based on the reconstructed industrial control loop, a control performance evaluation method based on random simulation data is proposed.

The evaluating the performance of the control loop includes the following specific steps:

Step (3-1): selecting a certain control performance index to adjust the parameters of the control modules; in this embodiment, selecting the control performance index such as the absolute value integral of the control error to adjust the parameters of the PID controller, the filter, the piece-wise linear function, the dead-band and other modules, denoted as $\theta_{C,i}$.

Step (3-2): performing simulation calculation using the adjusted parameters in the reconstructed entire control loop to obtain a corresponding reconstructed control performance index, and acquiring an ideal value that can be achieved by the reconstructed control performance index; in this embodiment, performing simulation calculation using the $\theta_{C,i}$ in the reconstructed control loop to obtain a control performance index corresponding to the $\theta_{C,i}$ and finding out an ideal value that can be achieved by the control performance index.

Step (3-3): comparing the current control performance index with the ideal value of the reconstructed control performance index to obtain a performance evaluation index of the control loop, thereby evaluating the performance of the entire control loop:

$$\eta = \frac{IAE_{Optimal}}{IAE_{Actual}}$$

wherein, $\eta$ is the performance evaluation index of the control performance index that is the absolute value integral of the control error, $IAE_{Actual}$ is the current value of the control performance index: $IAE_{Actual}=\Sigma_{i=1}^{N}|r(t)-y(t)|$; and $IAE_{Optimal}$ is the ideal value of the control performance index: $IAE_{Optimal}=\min\Sigma_{i=1}^{N}|r(t)-\tilde{y}_i(t)|$. Here $\tilde{y}_i(t)$ is the reconstructed value of the controlled variable corresponding to the adjustment parameter $\theta_{C,i}$ and its calculation process is, in the reconstructed control loop, performing simulation calculation on the reconstructed control loop using the $i^{th}$ group of control loop parameters to obtain a controlled variable. Since $IAE_{Optimal} \leq IAE_{Actual}$, the value range of $\eta$ is [0, 1]. If $\eta$ is close to 1, it indicates that the current control performance is good and the potential space for improving the performance is small. Otherwise, it indicates that the control performance can be significantly improved by adjusting the parameters of the control loop modules such as the parameters of the PID controller.

The performance evaluation index $\eta$ is calculated through full loop reconstruction simulation based on the mathematical model of the controlled object. Thus, $\eta$ has a range of uncertainty and it is necessary to define the reliability of $\eta$.

The defining the reliability of the obtained performance evaluation index of the control loop includes the following specific steps:

generating matched random model parameters according to the statistical distribution of parameters of the optimized model of the controlled object, and performing simulation calculation using the adjusted random model parameters in the reconstructed entire control loop to obtain a confidence interval of the performance evaluation index of the control loop.

In this embodiment, the model parameter vector is denoted as $\theta=[a_1, a_2, \ldots, a_{n_a}, b_1, b_2, \ldots, b_{n_b}]^T$, the estimated parameter vector is denoted as $\hat{\theta}=[\hat{a}_1, \hat{a}_2, \ldots, \hat{a}_{n_a}, \hat{b}_1, \hat{b}_2, \ldots, \hat{b}_{n_b}]^T$, and according to the asymptotic theory result of system identification, the statistical distribution of $\hat{\theta}$ is a Gaussian distribution with a mean vector $\theta$ and a covariance matrix $Cov_\theta$. A model parameter $\hat{\theta}_j$ within a 95% confidence interval of $\hat{\theta}$ is randomly generated by adopting a Monte-Carlo simulation method according to the statistical distribution of $\hat{\theta}$, $j=1, 2, \ldots, M$ and simulation calculation of full loop reconstruction is performed on the mathematical model of the controlled object to obtain a corresponding performance evaluation index $\eta_j$ and the 95% confidence interval of $\eta$, i.e., $\eta_{CI}=[\min(\eta_j), \max(\eta_j)]$. For example, if a certain performance evaluation index is $\eta=0.9$ and the 95% confidence interval is $\eta_{CI}=[0.85, 0.95]$, it shows that the confidence interval of the performance evaluation result is small and the reliability of the performance evaluation result is high.

Embodiment 2

The objective of embodiment 2 is to provide a computer readable storage medium.

In order to achieve the above objective, the following technical solution is adopted in the present invention:

A computer readable storage medium stores a plurality of instructions adapted to be loaded by a processor of a mobile terminal device to perform the following processing:

performing reconstruction simulation on control modules one by one except a controlled object in a control loop, and judging the correctness of the reconstructed control modules;

establishing a mathematical model of the controlled object, connecting the mathematical model to the reconstructed control modules to complete reconstruction of the entire control loop, and optimizing the mathematical model of the controlled object to obtain an optimized model of the controlled object; and adjusting parameters of the control modules according to a control performance index, and performing simulation calculation on the reconstructed control loop using the parameters to obtain an ideal value of the reconstructed performance control index for evaluating the performance of the control loop.

Embodiment 2

The objective of embodiment 2 is to provide a terminal device.

In order to achieve the above objective, the following technical solution is adopted in the present invention:

A terminal device includes a processor and a computer readable storage medium, wherein the processor is used for implementing instructions; and the computer readable storage medium is used for storing a plurality of instructions, and the instructions are adapted to be loaded by the processor to perform the following processing:

performing reconstruction simulation on control modules one by one except a controlled object in a control loop, and judging the correctness of the reconstructed control modules;

establishing a mathematical model of the controlled object, connecting the mathematical model to the reconstructed control modules to complete reconstruction of the entire control loop, and optimizing the mathematical model of the controlled object to obtain an optimized model of the controlled object; and adjusting parameters of the control modules according to a control performance index, and performing simulation calculation on the reconstructed control loop using the parameters to obtain an ideal value of the reconstructed performance control index for evaluating the performance of the control loop.

In this embodiment, the examples of the computer readable recording medium include a magnetic storage medium (e.g., an ROM, an RAM, a USB, a floppy disk, a hard disk, etc.), an optical recording medium (e.g., a CD-ROM or a DVD), a PC interface (e.g., a PCI, PCI-Express, WiFi, etc.), etc. However, various aspects of the present disclosure are not limited thereto.

The present invention has the following advantages:

Through the method and the device for evaluating the performance of an industrial control loop based on full loop reconstruction simulations according to the present invention, under the computer environment, each control module of the industrial control loop is reconstructed, simulation calculation is performed on the reconstructed control loop, and the degree of influence of each control module on the performance of the control loop is evaluated to provide an improved and optimized technical solution for the control performance. Compared with the prior art, the present invention has the following advantages:

1) The performance evaluation of the object is expanded: the influence of not only the PID controller but also the control modules such as a filter, a piece-wise linear function and a deadband on the control performance can be evaluated;

2) The estimated accuracy of the mathematical model of the controlled object is improved: the second performance index not only compared the degrees of fitness of the controlled variable and a reconstructed signal thereof, but also compared the degrees of fitness of the control instruction and a reconstructed signal thereof, thereby effectively improving the estimated accuracy of the mathematical model; and 3) The reliability of the performance evaluation result is quantified: matched random model parameters are generated according to the statistical distribution of model parameters, and simulation calculation is performed on the reconstructed control loop to obtain a confidence interval of the performance evaluation index.

The above descriptions are merely preferred embodiments of the present application, and the present application is not limited therein. Various modifications and variations may be made to the present application for those skilled in the art. Any modification, equivalent substitution, improvement or the like made within the spirit and principle of the present application shall fall into the protection scope of the present application.

The invention claimed is:

1. A method for evaluating the performance of an industrial control loop based on full loop reconstruction simulations, comprising:

performing reconstruction simulation on control modules one by one except a controlled object in the control loop, and judging the correctness of the reconstructed control modules;

establishing a mathematical model of the controlled object, connecting the mathematical model to the reconstructed control modules to complete reconstruction of the entire control loop, and optimizing the mathematical model of the controlled object to obtain an optimized model of the controlled object; and adjusting parameters of the control modules according to a control performance index, and performing simulation calculation on the reconstructed control loop using the parameters to obtain an ideal value of the reconstructed performance control index for evaluating the performance of the control loop, wherein the judging the correctness of the reconstructed control modules comprises the following specific steps:

calculating the average value of a control instruction of the control loop;

inputting a controlled variable and a reference value of the control loop as input values of the reconstructed control loop composed of the reconstructed control modules to obtain an output of the reconstructed control loop as a reconstructed value of the control instruction of the control loop; and determining a first performance index according to the control instruction of the control loop, the average value of the control instruction and the reconstructed value of the control instruction for judging the correctness of the reconstructed control modules.

2. The method for evaluating the performance of an industrial control loop based on full loop reconstruction simulations according to claim 1, wherein the control modules and the connection relationship between the control modules are determined according to the actual control loop; and the control modules comprise but are not limited to PID controllers, filters, piece-wise linear functions or deadbands.

3. The method for evaluating the performance of an industrial control loop based on full loop reconstruction simulations according to claim 1, wherein when the judged correctness of the reconstructed control modules is satisfied, the mathematical model of the controlled object is established next;

otherwise, the reconstructed control modules have errors, the construction algorithm of each control module is checked to find out and correct errors, the simulation control modules are reconstructed, and the correctness of the reconstructed control modules is judged until the judged correctness of the reconstructed control modules is satisfied.

4. The method for evaluating the performance of an industrial control loop based on full loop reconstruction simulations according to claim 1, wherein the optimizing the mathematical model of the controlled object comprises the following specific steps:

establishing an optimization function according to the reconstructed entire control loop, the physical meaning of the optimization function being the degree of fitness between the control instruction of the entire control loop and the reconstructed value and observed value of the controlled variable; and taking the maximum value of the optimization function to obtain the optimized model of the controlled object.

5. The method for evaluating the performance of an industrial control loop based on full loop reconstruction simulations according to claim 4, wherein after the mathematical model of the controlled object is optimized, the judging the correctness of the optimized model of the controlled object comprises the following specific steps:

determining the weights of the control instruction of the entire control loop and the controlled variable, the sum of the two weights being 1;

calculating the average value of the control instruction according to the control instruction of the entire control loop; calculating the average value of the controlled variable according to the controlled variable of the entire control loop;

inputting the controlled variable and the reference value of the entire control loop as input values of the reconstructed entire control loop to obtain an input of the optimized model of the controlled object as a reconstructed value of the control instruction of the entire control loop and an output of the reconstructed entire control loop as a reconstructed value of the controlled variable of the entire control loop; and determining a second performance index according to the weights of the control instruction of the reconstructed entire control loop and the controlled variable, the average values of the control instruction and the controlled variable and the reconstructed values of the control instruction and the controlled variable for judging the correctness of the optimized model of the controlled object.

6. The method for evaluating the performance of an industrial control loop based on full loop reconstruction simulations according to claim 1, wherein the evaluating the performance of the control loop comprises the following specific steps:

selecting at least one control performance index to adjust the parameters of the control modules;

performing simulation calculation using the adjusted parameters in the reconstructed entire control loop to obtain a corresponding reconstructed control performance index, and acquiring an ideal value that can be achieved by the reconstructed control performance index; and comparing the selected control performance index with the ideal value of the reconstructed control performance index to obtain a performance evaluation index of the control loop, thereby evaluating the performance of the entire control loop.

7. The method for evaluating the performance of an industrial control loop based on full loop reconstruction simulations according to claim 6, further comprising defining a reliability of the obtained performance evaluation index of the control loop comprising:

generating matched random model parameters according to a statistical distribution of parameters of the optimized model of the controlled object, and performing simulation calculation using adjusted random model parameters in the reconstructed entire control loop to obtain a confidence interval of the performance evaluation index of the control loop.

8. A non-transitory computer readable storage medium, storing a plurality of instructions adapted to be loaded by a processor of a mobile terminal device to perform the following processing:

performing reconstruction simulation on control modules one by one except a controlled object in a control loop, and judging the correctness of the reconstructed control modules;

establishing a mathematical model of the controlled object, connecting the mathematical model to the reconstructed control modules to complete reconstruction of the entire control loop, and optimizing the mathematical model of the controlled object to obtain an optimized model of the controlled object; and adjusting parameters of the control modules according to a control performance index, and performing simulation calculation on the reconstructed control loop using the parameters to obtain an ideal value of the reconstructed performance control index for evaluating the performance of the control loop, wherein the optimizing the mathematical model of the controlled object comprises the following specific steps:

establishing an optimization function according to the reconstructed entire control loop, the physical meaning of the optimization function being the degree of fitness between the control instruction of the entire control loop and the reconstructed value and observed value of the controlled variable; and taking the maximum value of the optimization function to obtain the optimized model of the controlled object.

9. A terminal device, comprising a processor and a computer readable storage medium, wherein the processor is used for implementing instructions; the computer readable storage medium is used for storing a plurality of instructions, and the instructions are adapted to be loaded by the processor to perform the following processing:

performing reconstruction simulation on control modules one by one except a controlled object in a control loop, and judging the correctness of the reconstructed control modules;

establishing a mathematical model of the controlled object, connecting the mathematical model to the reconstructed control modules to complete reconstruction of the entire control loop, and optimizing the mathematical model of the controlled object to obtain an optimized model of the controlled object; and adjusting parameters of the control modules according to a control performance index, and performing simulation calculation on the reconstructed control loop using the parameters to obtain an ideal value of the reconstructed performance control index for evaluating the performance of the control loop, wherein the evaluating the performance of the control loop comprises the following steps:

selecting at least one control performance index to adjust the parameters of the control modules;

performing simulation calculation using the adjusted parameters in the reconstructed entire control loop to obtain a corresponding reconstructed control performance index, and acquiring an ideal value that can be achieved by the reconstructed control performance index; and comparing the selected control performance index with the ideal value of the reconstructed control performance index to obtain a performance evaluation index of the control loop, thereby evaluating the performance of the entire control loop, and wherein reliability of the obtained performance evaluation index of the control loop is defined by one or more steps comprising:

generating matched random model parameters according to a statistical distribution of parameters of the optimized model of the controlled object, and performing simulation calculation using adjusted random model parameters in the reconstructed entire control loop to obtain a confidence interval of the performance evaluation index of the control loop.

* * * * *